United States Patent
Fleischer et al.

(10) Patent No.: US 10,897,341 B2
(45) Date of Patent: Jan. 19, 2021

(54) DETECTING INTERMODULATION IN BROADBAND COMMUNICATION AFFECTING RECEIVER SENSITIVITY

(75) Inventors: Marko Fleischer, Unterhaching (DE); Michael Kronwald, Puchheim (DE); Thomas Klink, Ottobrunn (DE); Jan Hellmann, Munich (DE); Eric Koenig, Bernstadt (DE)

(73) Assignee: Nokia Solutions and Networks Oy, Espoo (FI)

( * ) Notice: Subject to any disclaimer, the term of this patent is extended or adjusted under 35 U.S.C. 154(b) by 253 days.

(21) Appl. No.: 14/414,988

(22) PCT Filed: Jul. 18, 2012

(86) PCT No.: PCT/EP2012/064092
§ 371 (c)(1),
(2), (4) Date: May 1, 2015

(87) PCT Pub. No.: WO2014/012585
PCT Pub. Date: Jan. 23, 2014

(65) Prior Publication Data
US 2015/0358144 A1    Dec. 10, 2015

(51) Int. Cl.
*H04W 24/10* (2009.01)
*H04L 5/14* (2006.01)
*H04L 12/24* (2006.01)
*H04B 17/17* (2015.01)
*H04B 17/19* (2015.01)
*H04B 17/10* (2015.01)

(52) U.S. Cl.
CPC ........... *H04L 5/143* (2013.01); *H04B 17/104* (2015.01); *H04B 17/17* (2015.01); *H04B 17/19* (2015.01); *H04L 41/0677* (2013.01); *H04W 24/10* (2013.01)

(58) Field of Classification Search
CPC ...... H04W 72/04; H04W 88/08; H04W 76/00
See application file for complete search history.

(56) References Cited

U.S. PATENT DOCUMENTS 4,876,553 A * 10/1989 Nathrath ............... H01Q 1/1264
343/756
5,280,472 A * 1/1994 Gilhousen ............... H01Q 21/29
342/375
(Continued)

FOREIGN PATENT DOCUMENTS

CN        101502007 A    8/2009
DE    102010033841 A1    2/2012
(Continued)

*Primary Examiner* — Hassan A Phillips
*Assistant Examiner* — Prenell P Jones
(74) *Attorney, Agent, or Firm* — Harrington & Smith (57) ABSTRACT

The present invention provides methods, apparatuses and a program relating to detecting passive intermodulation in broadband communication. The present invention includes transmitting, at a base station, a first signal at a first centre frequency and a second signal at a second centre frequency with a predetermined transmit power, capturing, at the base station, received signal at a reception frequency, obtaining, at the base station, a delay between the transmitted signal and a passive intermodulation caused received signal.

15 Claims, 8 Drawing Sheets

(56) References Cited

U.S. PATENT DOCUMENTS

| | | | |
|---|---|---|---|
| 5,602,834 A * | 2/1997 | Dean | H01Q 21/29 370/335 |
| 9,291,652 B2 * | 3/2016 | Cordaro | G01R 23/20 |
| 10,063,287 B2 * | 8/2018 | Kummetz | H04W 28/08 |
| 2009/0086864 A1 | 4/2009 | Komninakis et al. | |
| 2009/0315639 A1 * | 12/2009 | Lee | H01P 1/15 333/108 |
| 2010/0164504 A1 * | 7/2010 | Bradley | H04B 3/46 324/520 |
| 2011/0075754 A1 * | 3/2011 | Smith | H04B 1/109 375/285 |
| 2012/0001735 A1 * | 1/2012 | Fink | G06K 19/0675 340/10.4 |
| 2012/0295558 A1 | 11/2012 | Wang et al. | |
| 2013/0012062 A1 * | 1/2013 | Nugent | H01R 9/05 439/578 |
| 2013/0071112 A1 * | 3/2013 | Melester | H04B 17/0085 398/38 |
| 2013/0322395 A1 * | 12/2013 | Kazmi | H04W 72/082 370/329 |
| 2014/0342674 A1 * | 11/2014 | Melester | H04B 17/0085 455/67.13 |
| 2016/0337050 A1 * | 11/2016 | Melester | H04B 17/0085 |
| 2019/0097739 A1 * | 3/2019 | Melester | H04B 17/0085 |

FOREIGN PATENT DOCUMENTS

| | | |
|---|---|---|
| DE | 10 2010 046 099 A1 | 3/2012 |
| KR | 10-2011-0071722 | 6/2011 |
| KR | 10-1136994 | 4/2012 |
| KR | 10-2012-0065127 | 6/2012 |
| WO | WO 00/57571 | 9/2000 |
| WO | WO-2009082084 A1 | 7/2009 |
| WO | WO 2012/009757 A1 | 1/2012 |

\* cited by examiner

DETECTING INTERMODULATION IN BROADBAND COMMUNICATION AFFECTING RECEIVER SENSITIVITY

FIELD OF THE INVENTION

The present invention relates to detecting passive intermodulation in broadband communication. In particular, the present invention relates to methods, apparatuses and a program for detecting passive intermodulation in broadband communication. If in later chapters it is referred to intermodulation only, intermodulation caused by passive elements is addressed, also known as PIM.

BACKGROUND OF THE INVENTION

In broadband FDD BTS (frequency division duplex base transceiver station) receiver architectures, intermodulation products/distortions are of major concerns and can jeopardize the receiver performance.

Intermodulation products (PIM) can fall in the own receive band and degrade the receiver performance. The Intermodulation level depends on the network performance, equipment and used material, the transmission power as well as modulation and bandwidth. The intermodulation characteristic changes over lifetime of the network (aging) and can today in real sites only be indirectly measured via KPI (key performance indicator). With broadband products, intermodulation distortion is becoming more critical.

Figure 1:
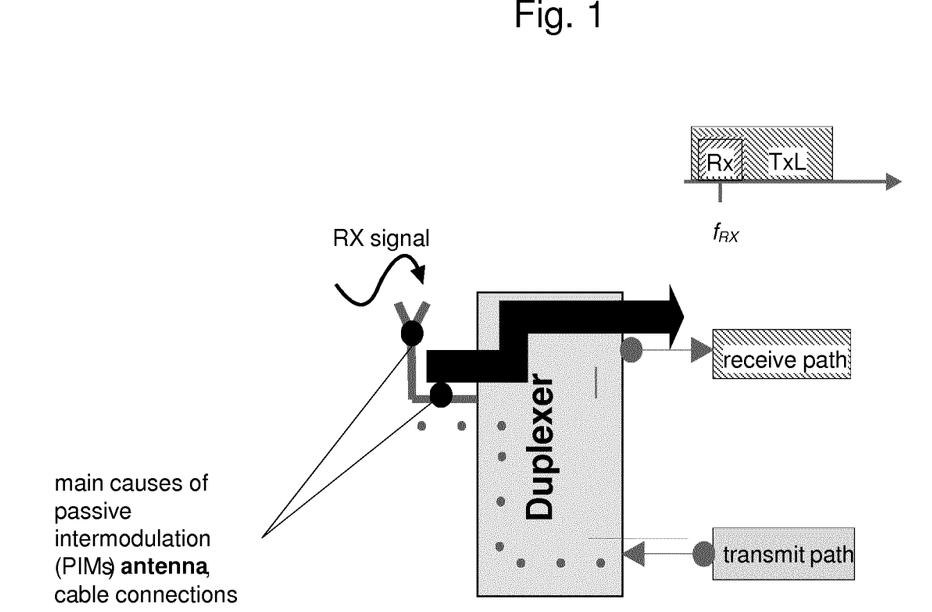
FIG. 1 is a diagram illustrating occurrence of passive intermodulation in a network.

FIG. 1 is a diagram illustrating occurrence of passive intermodulation in a network.

Passive intermodulation occurs when in the downlink band two or more frequencies are used simultaneously. A frequency stemming from the passive intermodulation can land in the frequency range dedicated to the uplink channel and thus cause interference and hence performance degradation to the real uplink signals.

Passive intermodulation (PIM) products are generated by at least two carriers impinging a non-linear junction. That is, if at least two frequencies exist in a non-linear device, sum and difference frequencies are produced.

For a given setup with only 2 frequencies F1 and F2, frequencies of all IM products are calculated as follows:

$$F_{IM(O)} = m\,F1 +/- n\,F2 \quad (1)$$

where O indicates the order, which is indicated by m+n.

That is, the frequency of lower odd IM products is calculated as follows:

$$F_{IM3} = 2F1 - F2 \quad (2)$$

$$F_{IM5} = 3F1 - 2F2 \quad (3)$$

$$\vdots$$

$$F_{IM(O)} = mF1 - nF2 \quad (4)$$

For calculating the upper odd IM products, F1 and F2 have to be interchanged.

Figure 2:
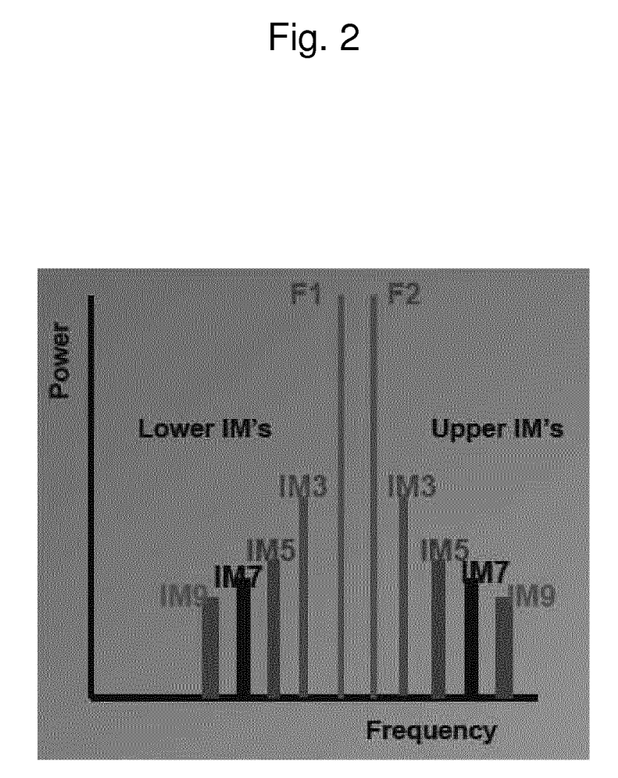
FIG. 2 is a diagram illustrating the lower and upper odd IM products for illustration purposes.

FIG. 2 is a diagram illustrating the lower and upper odd IM products for illustration purposes.

Figure 3:
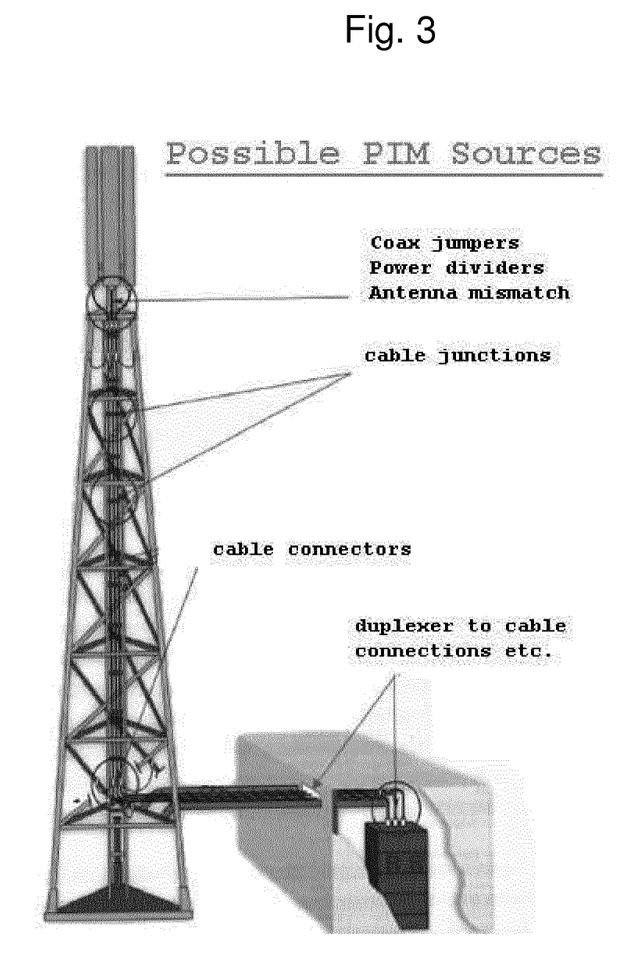
FIG. 3 is a schematic overview illustrating some possible PIM sources.

FIG. 3 illustrates some possible PIM sources. As shown in FIG. 3, PIM may occur at coax jumpers, cable junctions, cable connectors, and so on. For example, intermodulation distortions may be caused by corroded contacts at cable connectors, or the like.

In current FDD network radio equipment, a receiver degradation caused by passive intermodulation (PIM) problems is guessed today indirectly via statistical methods (KPI). Once UL (uplink) side problems are identified, external measurement equipment and on site tests are necessary to check the root cause of receiver desensitization.

Currently it is necessary to send service teams in field, rewire external PIM tester and do measurement in order to analyze site performance with respect to PIM problems. Standard measurement methods via e.g., the above mentioned external PIM tester are often limited to identify all network components causing PIM. The antenna lineup is composed of different cables, junctions, etc., all leading to PIM. Therefore, it is important to identify the main sources to correct the fault. This however, is time and resource consuming, in particular when aging of components leads to a slowly decreased PIM performance of a site.

Hence, the currently known solutions are expensive in terms of extra equipment (CAPEX, capital expenditure) and labour effort (OPEX, operational expenditure).

SUMMARY OF THE INVENTION

According to the present invention, there are provided a method, apparatus and a program for detecting intermodulation in broadband communication affecting receiver sensitivity.

According to an aspect of the present invention, there is provided a method comprising:

transmitting, at a base station, a first signal at a first centre frequency and a second signal at a second centre frequency with a predetermined transmit power, capturing, at the base station, received signal at a reception frequency, obtaining, at the base station, a delay between the transmitted signal and a passive intermodulation caused received signal.

According to further refinements as defined under the above aspect, the method further comprises capturing, at the base station, a combined transmission signal, and predicting, at the base station, the passive intermodulation caused received signal based on the combined transmission signal;

measuring, at the base station, the delay between the transmit signal and the passive intermodulation caused received signal;

obtaining, at the base station, the delay between the transmit signal and the passive intermodulation caused received signal using correlation;

estimating, at the base station, a fault location within an antenna lineup based on the obtained delay between the transmit signal and the passive intermodulation caused received signal and a reference delay between the transmitted signal and its related received signal;

wherein the reference delay between the transmitted signal and its related received signal is known in advance;

measuring, at the base station, a received signal power at a reception frequency, identifying, at the base station, passive intermodulation caused received signal power components in the received signal power using non linear modeling, and calculating, at the base station, a difference between the passive intermodulation caused received signal power components and the transmit power;

wherein the base station is a frequency division duplex base transceiver station.

According to another aspect of the present invention, there is provided an apparatus comprising a receiver/transmitter configured to communicate with at least another apparatus, a memory configured to store computer program code, and a processor configured to cause the apparatus to perform:

transmitting a first signal at a first centre frequency and a second signal at a second centre frequency with a predetermined transmit power, capturing received signal at a reception frequency, obtaining a delay between the transmitted signal and a passive intermodulation caused received signal.

According to further refinements as defined under the above aspect, the processor is configured to cause the apparatus to further perform capturing a combined transmission signal, and predicting the passive intermodulation caused received signal based on the combined transmission signal;

measuring the delay between the transmit signal and the passive intermodulation caused received signal;

obtaining the delay between the transmit signal and the passive intermodulation caused received signal using correlation;

estimating a fault location within an antenna lineup based on the obtained delay between the transmit signal and the passive intermodulation caused received signal and a reference delay between the transmitted signal and its related received signal;

wherein the reference delay between the transmitted signal and its related received signal is known in advance;

measuring a received signal power at a reception frequency, identifying passive intermodulation caused received signal power components in the received signal power using non linear modeling, and calculating a difference between the passive intermodulation caused received signal power components and the transmit power;

wherein the apparatus is a frequency division duplex base transceiver station.

According to another aspect of the present invention there is provided a computer program product comprising code means adapted to produce steps of any of the methods as described above when loaded into the memory of a computer.

According to a still further aspect of the invention there is provided a computer program product as defined above, wherein the computer program product comprises a computer-readable medium on which the software code portions are stored.

According to a still further aspect of the invention there is provided a computer program product as defined above, wherein the program is directly loadable into an internal memory of the processing device.

BRIEF DESCRIPTION OF THE DRAWINGS

These and other objects, features, details and advantages will become more fully apparent from the following detailed description of embodiments of the present invention which is to be taken in conjunction with the appended drawings, in which.

DETAILED DESCRIPTION

In the following, embodiments of the present invention are described by referring to general and specific examples of the embodiments, wherein the features of the embodiments can be freely combined with each other unless otherwise described. It is to be understood, however, that the description is given by way of example only, and that the described embodiments are by no means to be understood as limiting the present invention thereto.

In view of the above described problems, it is an idea of the present invention to detect the passive intermodulation (IM) frequency term in the uplink connection and to eliminate the effect thereof.

According to an embodiment of the invention, it is proposed to search for the place where the cross-talk occurs with the intention to eliminate the weak spot or spots of the connection or cabling between the base station and the antenna.

That is, it is proposed to directly use BTS radio resources to identify the location of passive IMs in an antenna network. The known TDR (time-domain reflectometry) can be used and also CCR (cross correlation) with the particularity that the resulting PIM signal is predicted via appropriate modeling from the transmitted signal. This yields in a reference for correlation or TDR with the received PIM.

According to another embodiment of the present invention, it is proposed to measure the strength of the passive intermodulation signals. Outlining the place of the problem allows a proper fault correction e.g. re-cabeling. Channels suffering desensitization could also either be blocked for communication or the interfered signal could be deducted from the total received signal as some kind of PIM interference suppression.

Thus, it is proposed to use the BTS radio resources to directly measure, over a short period of time, the entire passive intermodulation performance of the radio cell and to judge desensitization effects with an application. Such an application could run centralized in a remotely connected service center.

In the following, methods are described to allow the identification of critical PIM locations simplifying service field engineers to correct the fault.

In principle, there are two main concepts to identify transmission line health conditions, namely, TDR (time domain reflectometry) and cross correlation method CCR. Both methods are widely used in order to check VSWR (voltage standing wave ratio) problems with the antenna lineup.

However, passive intermodulation problems are different in nature and therefore sites suffering from PIM problems could have no VSWR issues at all and vice versa. Furthermore, it is noted that VSWR issues are in downlink direction whereas PIM problems are impacting the uplink. This leads to the need to measure passive intermodulation distortion and detecting the location of appearance independently from VSWR.

In case the TDR approach is used, two pulse like signals on different frequencies are to be generated from the base transceiver station and its intermodulation products (IM3, IM5, IM7, etc., as described above) are to be received. Sending and capturing data is time synchronized. The delay, and hence, the fault location can be estimated together with propagation/PIM models within the antenna lineup.

Instead of measuring directly the time difference, i.e. the delay between received and estimated/predicted PIM signals, the CCR approach uses correlation to obtain the delay. Both methods lead eventually to the place of the PIM appearance.

According to both methods, not only one PIM source can be revealed in the antenna network, but also several locations can be spotted as long as PIM power can be measured.

In the following, a measurement principle according to the CCR distance to fault estimation will be described. Thus, the CCR test procedure is as follows.

First, two transmission signals at centre frequencies $f_1$ and $f_2$ are identified. As centre frequencies $f_1$ and $f_2$, those frequencies are taken for which the highest PIM $P_R$ is measured from previous tests and obviously its PIM result is degrading the receive channel.

Then, two modulated broadband carriers, e.g. LTE5 (WCDMA) with independent noise characteristic are centered and transmitted at $f_1$ and $f_2$ with maximum or cell specific output power.

Then, the reception signal at $f_R$ and the combined transmission signal are captured. From the combined transmission signal, the PIM reception signal is predicted and correlation is used in order to find dominant PIM echo's.

Then, from calibration and/or hardware design, the basic signal delay from transmission to reception is known and relative thereto, the distance to PIM faults in cables/junctions can be predicted with an expected precision of about 2.5 m or less.

Figure 4:
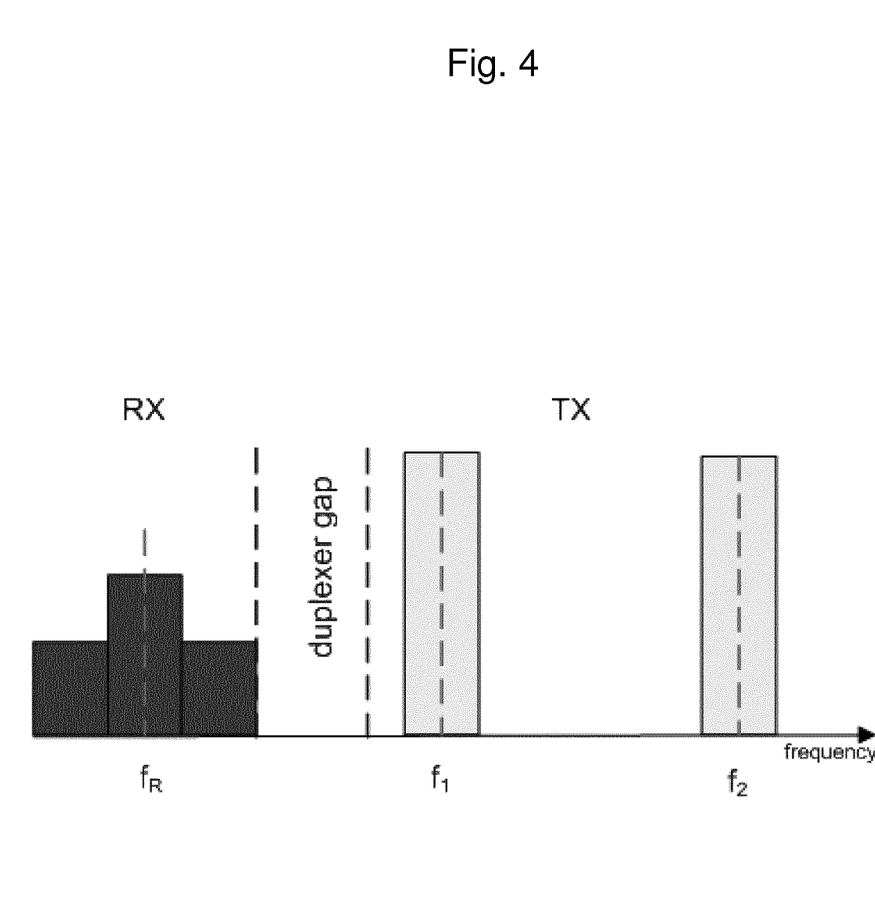
FIG. 4 is a diagram schematically illustrating transmission frequencies and the reception frequency according to an embodiment of the present invention.

FIG. 4 schematically illustrates frequencies $f_1$, $f_2$ and $f_R$.

This makes it simpler for service to decide countermeasures and eliminate, e.g. dominant PIM source by replacing for example an antenna or cables.

Currently, in order to evaluate PIMs, the classical method using site portable PIM analyzers is used using a 2 tone approach as indicated above.

The drawbacks of such solutions are the need for expensive extra equipment per frequency band. Further, on site support, like e.g. an extra team, is required that rewires cables and attaches the analyzer. Rewiring is often already changing the PIM characteristic of the setup. This solution is typically limited to a TX power of 2×43 dBm and to CW signals only which is the classical PIM tester feature set. Furthermore, in order to detect a main PIM source, often several measurements and rewiring are necessary.

In the following, a further test procedure according to an aspect of the present invention will be described.

First, two transmit signals (CW or modulated) at centre frequencies $f_1$ and $f_2$ with transmit power $P_t$ are created. Then, the received signal power $P_R$ at $f_R$ is measured and the PIM suppression of the network is calculated. The PIM suppression calculation is based on an a priori knowledge of the transmission characteristics and the transmission output power. Further, non linear modeling and timing information allow identification of PIM signal components within the receive signal and its receive level over bandwidth. The difference between the transmission power and the receive power relative to bandwidth then gives the PIM suppression value or likewise the signal to interferer degradation.

The measurement may be repeated with modified transmission frequencies in order to cover the whole reception channel. Then, the difference between $P_t$ and $P_R$ over the wanted receive frequencies can be displayed. The use of modulated signals allows the identification of own passive intermodulation power and excludes the influence of spurious emission from e.g. adjacent cells etc. This is a further advantage against external CW PIM measurement equipment leading often to wrong results.

Figure 5:
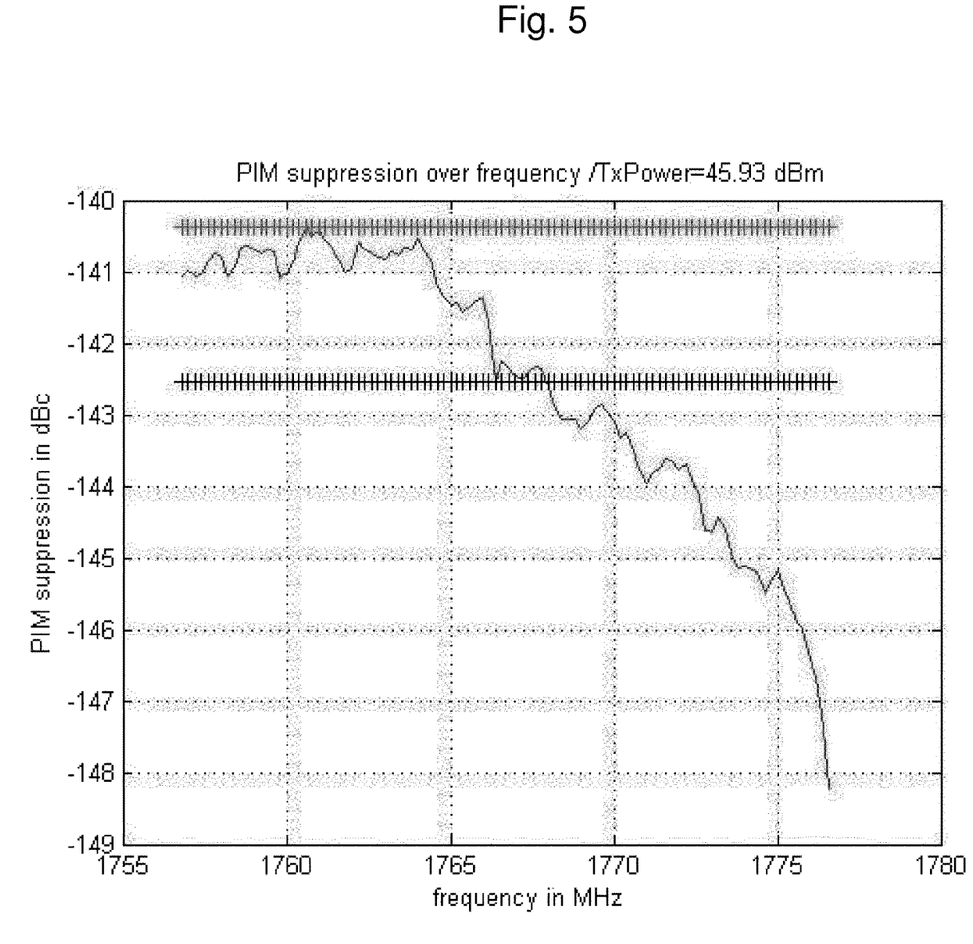
FIG. 5 is a diagram illustrating a measured PIM suppression level over the RX band range according to an embodiment of the present invention.
Figure 6:
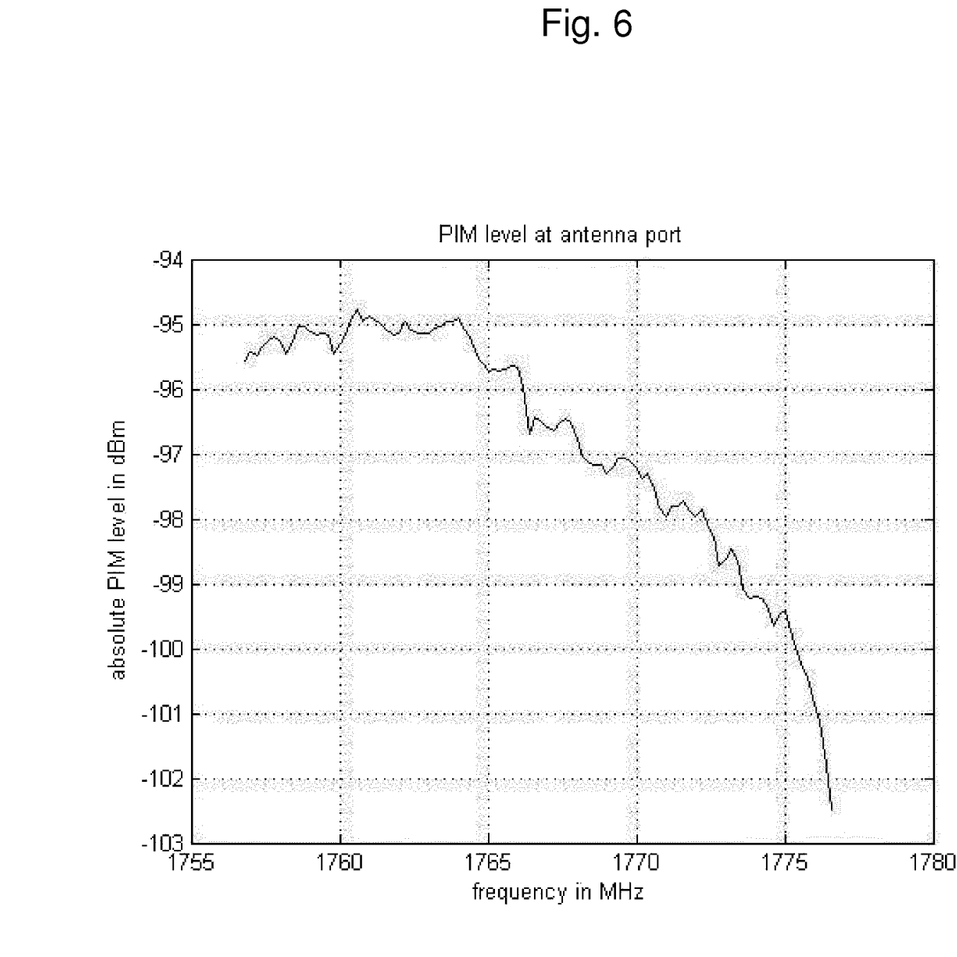
FIG. 6 is a diagram illustrating a measured absolute PIM receive level over the RX band range according to an embodiment of the present invention

FIG. 5 shows a diagram illustrating the measured PIM suppression level over the RX band range and FIG. 6 shows a diagram illustrating the measured absolute PIM receive level over a 20 MHz band III RX band range.

The PIM solution according to an aspect of the present invention is based on NSN (Nokia Siemens Networks) ASICS/FPGAs (application-specific integrated circuits/field-programmable gate arrays) called MAIA/MERA, as an example. Every FDD MAIA/MERA hardware (HW) design allows broadband capturing of RX data simultaneously sending of two carriers per pipe. This functionality realizes superior functionality as every external PIM on site tester.

According to the above described aspects and embodiments of the invention, the following advantages can be realized in comparison to the solutions using external tester.

For example, the existing site equipment, i.e. FDD BTS, can be directly used and there is no need for expensive extra equipment, like the external PIM tester. Further, the IM site performance can be directly seen including active IMs (PA, combiner, predistortion influence) and passive IMs (antenna, cable, feeder). Further, such a solution could be remotely controlled and requires less on site service and thus reduces manual engineering efforts. The TX output power is the same as used for the site and is not limited by the power capability of the external PIM tester.

According to the proposed solution, every standard (e.g., GSM, LTE, WCDMA, etc.) is supported as well as the CW measurement method. Further, there is no bandwidth limitation and the network IM suppression capability can be shown as wanted (e.g., IM3, IM5, IM7, . . . ).

Furthermore, several IM sources and levels can be detected at the same time and PIM location could be outlined.

Thus, according to the aspects and embodiments of the present invention as described above, it is possible to measure directly and remotely controlled, in an installed radio cell, the PIM behavior/performance of a setup/radio network without the need for external equipment, like e.g. a PIM tester.

Further, not only the PIM level and the receiver desensitization can be identified, but also the place of the fault or faults in a network can be determined, and thus, suitable measures for repair can be taken.

Furthermore, it is possible to identify the PIM also in presence of other radiating sources, like e.g. neighbor cell interference.

Figure 7:
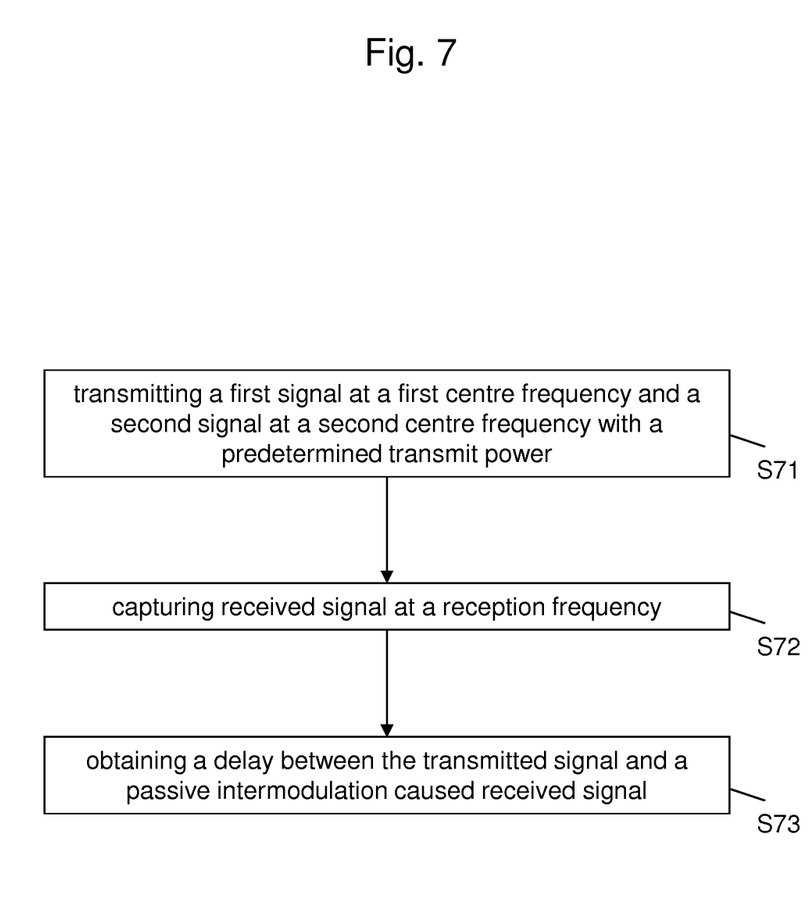
FIG. 7 is a flowchart illustrating processing of the apparatus according to certain embodiments of the present invention.

FIG. 7 is a flowchart illustrating processing of the apparatus according to certain embodiments of the present invention.

According to an embodiment of the present invention, first, in a step S71, the apparatus, i.e. the FDD BTS transmits a first signal at a first centre frequency and a second signal at a second centre frequency with a predetermined transmit power. Then, in a step S72, the BTS captures the received signal at a reception frequency, and then in a step S73, obtains a delay between the transmitted signal and a passive intermodulation caused received signal.

According to further aspects of the present invention, the BTS captures a combined transmission signal, and predicts the passive intermodulation caused received signal based on the combined transmission signal.

According to still further aspects of the present invention, the BTS measures the delay between the transmit signal and the passive intermodulation caused received signal, or obtains the difference between the transmit signal and the passive intermodulation caused received signal using correlation.

Then, the BTS estimates a fault location within an antenna lineup based on the obtained delay between the transmit signal and the passive intermodulation caused received signal and a reference delay between the transmitted signal and its related received signal. The reference delay between the transmitted signal and its related received signal is known in advance.

Furthermore, according to a further aspect of the invention, the BTS measures a received signal power at a reception frequency, identifies passive intermodulation caused received signal power components in the received signal power using non linear modeling, and calculates a difference between the passive intermodulation caused received signal power components and the transmit power.

Non linear modeling is a method or algorithm to predict from a known transmit signal the appearance of the PIM received signal, hence a mathematical abstraction to match the physical nature of a passive intermodulation happening e.g. at a corroded cable junction. The exactness of this model defines the precision of later stages like the delay estimation or a following PIM cancellation approach. Thus a good model comprises a complex non linear operation or several operations to estimate from the transmit signal the PIM receive signal.

Merely as an example, it is noted that the simplest IM3 PIM non linear modeling of a transmit signal Tx could be:

$$PIM\ IM3Rx = a*(Tx)^3$$

with a being a real or complex number. Good models reflecting the PIM are usually much more complex.

The present invention is of course not limited to the above described modeling example but includes all appropriate modeling.

Figure 8:
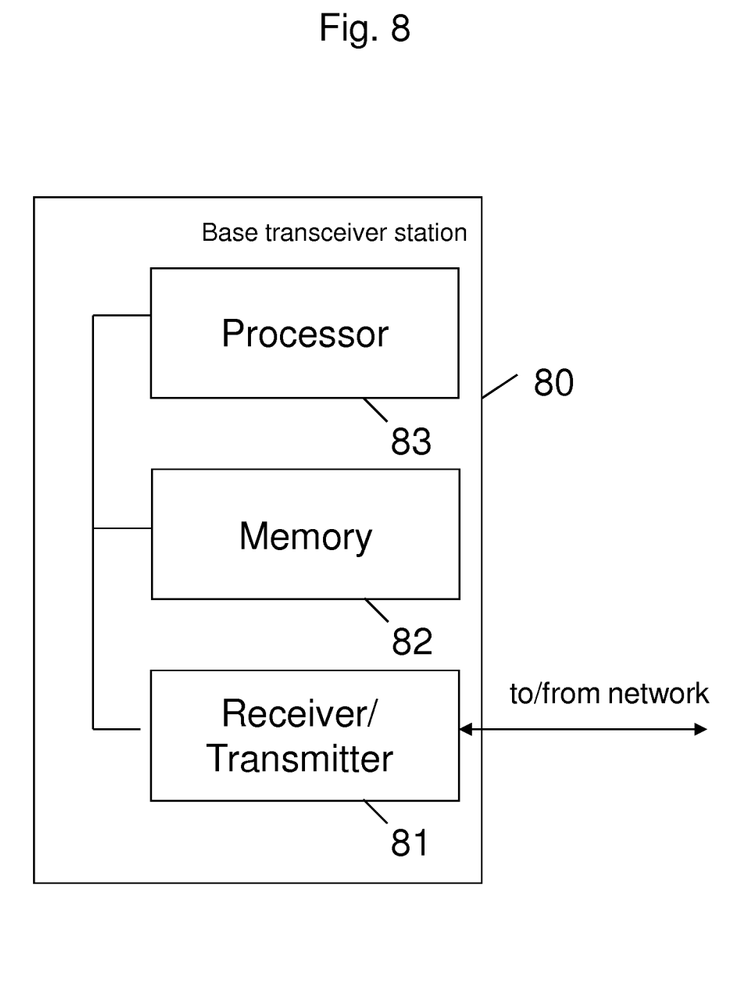
FIG. 8 is a block diagram showing an example of an apparatus according to certain embodiments of the present invention.

FIG. 8 is a block diagram showing an example of an apparatus according to certain embodiments of the present invention.

As shown in FIG. 8, according to an embodiment of the present invention, the apparatus 80, i.e. FDD BTS, comprises a receiver/transmitter 81, a memory 82 and a processor 83. The receiver/transmitter 81 configured to communicate with at least another apparatus in the network and to transmit and receive signals, the memory 82 is configured to store computer program code, and the processor 83 is configured to cause the apparatus to perform transmitting a first signal at a first centre frequency and a second signal at a second centre frequency with a predetermined transmit power, capturing received signal at a reception frequency, obtaining a delay between the transmitted signal and a passive intermodulation caused received signal. Further, the processor 83 is configured to cause the apparatus to perform any of the steps of the method described above.

In the foregoing exemplary description of the apparatus, only the units that are relevant for understanding the principles of the invention have been described using functional blocks. The apparatus may comprise further units that are necessary for its respective operation. However, a description of these units is omitted in this specification. The arrangement of the functional blocks of the apparatus is not construed to limit the invention, and the functions may be performed by one block or further split into sub-blocks.

When in the foregoing description it is stated that the apparatus, i.e. the MTC device (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

For the purpose of the present invention as described herein above, it should be noted that method steps likely to be implemented as software code portions and being run using a processor at a network element (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses, or any one of their respective units/means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

It is noted that the embodiments and general and specific examples described above are provided for illustrative purposes only and are in no way intended that the present invention is restricted thereto. Rather, it is the intention that all variations and modifications which fall within the scope of the appended claims are covered.

The invention claimed is:

1. A method, comprising:
transmitting, at a base station in a broadband communications system, a first signal at a first center frequency and a second signal at a second center frequency with a predetermined transmit power;
capturing, at the base station, received signal at a reception frequency;
capturing, at the base station, a combined transmission signal, where the combined transmission signal corresponds to the first signal and the second signal;
predicting, at the base station, a passive intermodulation caused received signal based on the combined transmission signal; and
obtaining, at the base station, a delay between a transmitted signal and the passive intermodulation caused received signal, where the transmitted signal comprises the first signal and the second signal.

2. The method according to claim 1, further comprising:
measuring, at the base station, the delay between the transmitted signal and the passive intermodulation caused received signal.

3. The method according to claim 1, further comprising:
obtaining, at the base station, the delay between the transmitted signal and the passive intermodulation caused received signal using correlation.

4. The method according to claim 1, further comprising:
estimating, at the base station, a fault location within an antenna lineup based on the obtained delay between the transmitted signal and the passive intermodulation caused received signal, and a reference delay between the transmitted signal and its related received signal, where the related received signal is predicted based, at least partially, on the transmitted signal.

5. The method according to claim 4, wherein the reference delay between the transmitted signal and its related received signal is known in advance.

6. The method according to claim 1, further comprising:
measuring, at the base station, a received signal power of the received signal at the reception frequency;
identifying, at the base station, one or more passive intermodulation caused received signal power components in the received signal power using non-linear modeling; and
calculating, at the base station, a difference between the one or more passive intermodulation caused received signal power components and the predetermined transmit power.

7. The method according to claim 1, wherein the base station is a frequency division duplex base transceiver station.

8. An apparatus comprising:
a receiver/transmitter configured to communicate in a broadband communications system with at least another apparatus,
a non-transitory memory configured to store computer program code, and
a processor configured to cause the apparatus to perform:
transmitting a first signal at a first center frequency and a second signal at a second center frequency with a predetermined transmit power;
capturing received signal at a reception frequency;
capturing a combined transmission signal, where the combined transmission signal corresponds to the first signal and the second signal;
predicting a passive intermodulation caused received signal based on the combined transmission signal; and
obtaining a delay between a transmitted signal and the passive intermodulation caused received signal, where the transmitted signal comprises the first signal and the second signal.

9. The apparatus according to claim 8, wherein the processor is configured to cause the apparatus to further perform:
measuring the delay between the transmit signal and the passive intermodulation caused received signal.

10. The apparatus according to claim 8, wherein the processor is configured to cause the apparatus to further perform:
obtaining the delay between the transmitted signal and the passive intermodulation caused received signal using correlation.

11. The apparatus according to claim 8, wherein the processor is configured to cause the apparatus to further perform:
estimating a fault location within an antenna lineup based on the obtained delay between the transmitted signal and the passive intermodulation caused received signal, and a reference delay between the transmitted signal and its related received signal, where the related received signal is predicted based, at least partially, on the transmitted signal.

12. The apparatus according to claim 11, wherein the reference delay between the transmitted signal and its related received signal is known in advance.

13. The apparatus according to claim 8, wherein the processor is configured to cause the apparatus to further perform:
  measuring a received signal power of the received signal at the reception frequency;
  identifying one or more passive intermodulation caused received signal power components in the received signal power using non-linear modeling; and
  calculating a difference between the one or more passive intermodulation caused received signal power components and the predetermined transmit power.

14. The apparatus according to claim 8, wherein the apparatus is a frequency division duplex base transceiver station.

15. A computer program product embodied on a non-transitory computer-readable medium in which a computer program is stored that, when being executed with a computer, is configured to control an apparatus to:
  transmit, in a broadband communications system, a first signal at a first center frequency and a second signal at a second center frequency with a predetermined transmit power;
  capture a received signal at a reception frequency;
  capture a combined transmission signal, where the combined transmission signal corresponds to the first signal and the second signal;
  predict a passive intermodulation caused received signal based on the combined transmission signal; and
  obtain a delay between a transmitted signal and the passive intermodulation caused received signal, where the transmitted signal comprises the first signal and the second signal.

* * * * *